United States Patent
Kumagai et al.

[11] Patent Number: 5,936,815
[45] Date of Patent: Aug. 10, 1999

[54] MAGNETIC HEAD

[75] Inventors: Seiji Kumagai; Junichi Honda; Norikatsu Fujisawa; Kyu Kanno, all of Miyagi, Japan

[73] Assignee: Sony Corporation, Tokyo, Japan

[21] Appl. No.: 08/931,743

[22] Filed: Sep. 16, 1997

[30] Foreign Application Priority Data

Sep. 17, 1996 [JP] Japan ................................ 8-245232

[51] Int. Cl.⁶ .............................................. G11B 5/147
[52] U.S. Cl. ............................................................ 360/126
[58] Field of Search ................................... 360/120–126

[56] References Cited

U.S. PATENT DOCUMENTS

| | | | |
|---|---|---|---|
| 4,656,547 | 4/1987 | Kumasaka et al. | 360/126 |
| 4,745,507 | 5/1988 | Otomo et al. | 360/125 |
| 4,769,729 | 9/1988 | Kumasaka et al. | 360/128 |
| 4,774,616 | 9/1988 | Kumasaka et al. | 360/121 |
| 4,819,113 | 4/1989 | Kubota et al. | 360/126 |
| 5,155,645 | 10/1992 | Shimizu et al. | 360/126 |
| 5,157,569 | 10/1992 | Kumasaka et al. | 360/126 |
| 5,164,870 | 11/1992 | Kato et al. | 360/120 |
| 5,276,575 | 1/1994 | Kobayashi et al. | 360/126 |
| 5,278,716 | 1/1994 | Okuda et al. | 360/120 |
| 5,421,915 | 6/1995 | Nakanishi et al. | 148/304 |
| 5,602,704 | 2/1997 | Gooch et al. | 360/125 |
| 5,684,659 | 11/1997 | Kawase et al. | 360/125 |
| 5,764,450 | 6/1998 | Sato et al. | 360/125 |
| 5,852,536 | 12/1998 | Matrunaga et al. | 360/122 |
| 5,875,081 | 2/1999 | Suzuki et al. | 360/125 |

*Primary Examiner*—Allen T. Cao
*Attorney, Agent, or Firm*—Hill & Simpson

[57] ABSTRACT

A thin film type magnetic head that electromagnetic conversion efficiency is improved by making gradually magnetic resistance larger with approaching to a magnetic gap can be provided. There is disclosed a magnetic head including a pair of magnetic core half members having nonmagnetic substrates and magnetic metal films formed on the nonmagnetic substrates and a coil formed at a concave part by a thin film forming process, the pair of magnetic core half members being jointed to each other opposite to each other through a magnetic gap formed between the respective magnetic metal films, the concave part formed on the surface formed by joining at least one of the magnetic metal films and the other magnetic metal film, wherein assistant cores consisting of magnetic materials are joined on the side of the surface by joining a pair of nonmagnetic substrates and the magnetic metal films are formed connected with the assistant cores.

9 Claims, 9 Drawing Sheets

MAGNETIC HEAD

BACKGROUND OF THE INVENTION

1. Field of the Invention

The present invention relates to a magnetic head that a magnetic path is formed by magnetic metal films.

2. Description of the Related Art

For example, in a magnetic recording/reproducing apparatus such as a video tape recorder, digital recording for recording by digitalizing a signal is progressed for improving image quality.

With improvement on high density of magnetic recording and high frequency of recording frequency, a magnetic head mounted on the magnetic recording/reproducing apparatus must exhibit high output and a little noise in a high frequency area. For example, in the compound-metal-in-gap type magnetic head that a magnetic metal film is formed on ferrite materials and a coil is wound which is used often for a conventional magnetic head for VTR, inductance is large and output per inductance drops, therefore, the output is low in the high frequency area and it is hard to correspond sufficiently to digital image recording that high frequency and density is necessary.

Therefore, the thin film type magnetic head manufactured by a thin film forming process is examined as the magnetic head corresponding to the high frequency.

The thin film type magnetic head is formed by joining a pair of magnetic head half members having magnetic metal films through a gap material. The magnetic metal films are buried into the magnetic head half members, the joined surface includes nonmagnetic materials such as glass and an almost rectangular concave part for forming a coil is provided almost at the center. Further, the magnetic head half members have a coil (not shown) formed by the thin film forming method such as photo lithography in a concave part for forming the coil. A magnetic gap is formed between the magnetic metal films by joining a pair of magnetic head half members through a gap material including of a nonmagnetic substance.

Magnetic metal films 100A and 100B which the magnetic head half members include, as shown in FIG. 1, form a magnetic core 101 that is a magnetic path in the thin film magnetic head by joining a pair of magnetic head half members. A concave part 102 is formed at the magnetic metal films 100A and 100B and the concave part 102 forms the concave part for forming the coil as above mentioned. These magnetic metal films 100A and 100B, for example, in case of being used as the magnetic head for 8 mm, are that the magnetic core 101 as shown by A in FIG. 1 is about 200 micrometers wide and a medium siding part as shown by B in FIG. 1 is about 50 micrometers wide. The width A of the magnetic core 101 is regulated by depending on the width of the whole form of the magnetic head.

The width B of the medium sliding part is formed comparatively small for controlling the contact width with a medium. Therefore, when a pair of magnetic metal films 100A and 100B are joined, the magnetic core 101 is formed almost convex that an opening part 103 is in the neighborhood of the center.

Thus, the thin film type magnetic head is formed as the width B regulated by thickness of the medium sliding part of the magnetic core 101 is smaller than the width A regulated by the thickness of the magnetic head. Therefore, the magnetic head keeps good contact with the magnetic recording medium and maintains good magnetic resistance.

When a signal magnetic field is reproduced or recorded to the magnetic recording medium in the conventional thin film magnetic head, the magnetic core 101 formed by joining the magnetic metal films 100A and 100B is the magnetic path. That is to say, the magnetic field generated by the coil formed in the concave part for forming the coil or the signal magnetic field generated by the magnetic recording medium magnetizes the magnetic core 101 formed by joining the magnetic metal films 100A and 100B.

Further, the conventional thin film type magnetic head is formed as the width A regulated by the thickness of the magnetic head is larger than the width B regulated by thickness of the medium sliding part. Therefore, in the thin film type magnetic head, as shown in FIG. 2, form of the magnetic core 101 that is a magnetic path is almost convex. Further, in the thin film magnetic head, as above mentioned, the concave part for forming the coil is formed. Therefore, in the thin film magnetic head, an opening part 103 is almost at the center of the magnetic core formed almost convex.

In the conventional thin film type magnetic head, when the magnetic core 101 is almost formed convex, cross section of each part of the magnetic core 101 is different. Further, in the thin film type magnetic head, when the cross section of each part of the magnetic core 101 is different, magnetic resistance is changed according to change of the cross section. That is to say, in the thin film type magnetic head, as shown by R in FIG. 2, the magnetic resistance becomes sharply large at the part where the cross section becomes sharply small.

Generally, in the magnetic head, it is considered that when the magnetic resistance becomes gradually larger from the part on which the coil is wound to the magnetic gap, electromagnetic conversion efficiency is good. However, in the thin film magnetic head, the magnetic resistance sharply becomes large at an area R as above mentioned. Therefore, in the conventional thin film type magnetic head, there was a problem that the electromagnetic conversion efficiency dropped.

SUMMARY OF THE INVENTION

The present invention has solved the problem of the conventional thin film type magnetic head, and has as its object to provide a thin film type magnetic head that electromagnetic conversion efficiency is improved by making gradually magnetic resistance larger with approaching to a magnetic gap.

A magnetic head according to the present invention which has solved the above object includes a pair of magnetic core half members having nonmagnetic substrates and magnetic metal films formed on the nonmagnetic substrates and a coil formed at a concave part by a thin film forming process, the pair of magnetic core half members being jointed to each other opposite to each other through a magnetic gap formed between the respective magnetic metal films, the concave part formed on the surface formed by joining at least one of the magnetic metal films and the other magnetic metal film, wherein assistant cores consisting of magnetic materials are joined on the side of the surface by joining a pair of nonmagnetic substrates and the magnetic metal films are formed connected with the assistant cores.

In the magnetic head according to the present invention formed as above mentioned, the assistant cores consist of magnetic materials, therefore, even the assistant cores form a magnetic path. Therefore, in this magnetic head, the assistant cores assist the magnetic path at the part that magnetic resistance of the magnetic metal films become large. Therefore, as in the magnetic head according to the present invention the magnetic resistance of the magnetic cores is ideally distributed, electromagnetic conversion characteristic is superior.

DESCRIPTION OF THE PREFERRED EMBODIMENT

An embodiment of a magnetic head according to the present invention will be described below with reference to the accompanying drawings.

Figure 1:
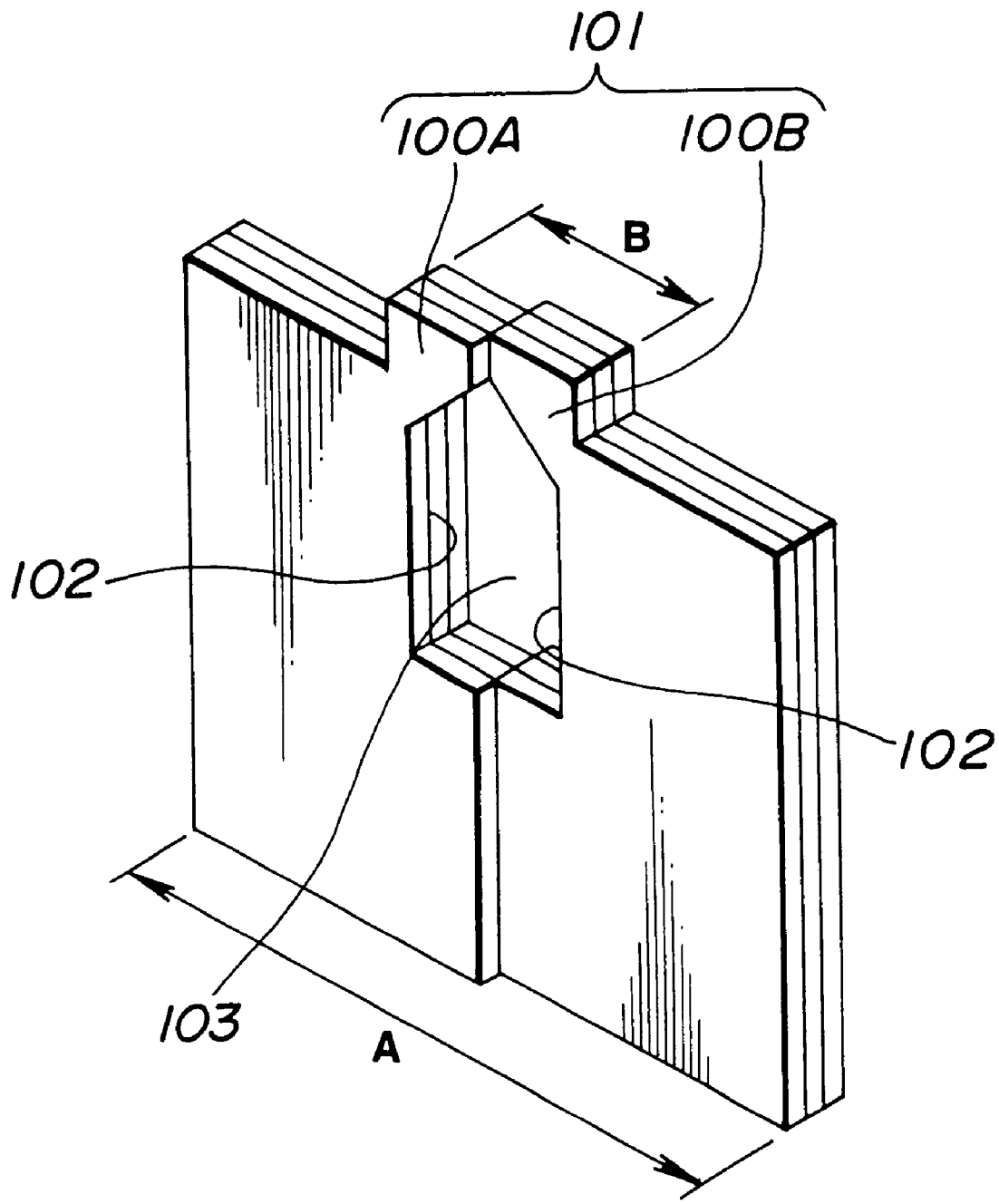
FIG. 1 is a slant view of a magnetic core of which a conventional magnetic head consist.
Figure 2:
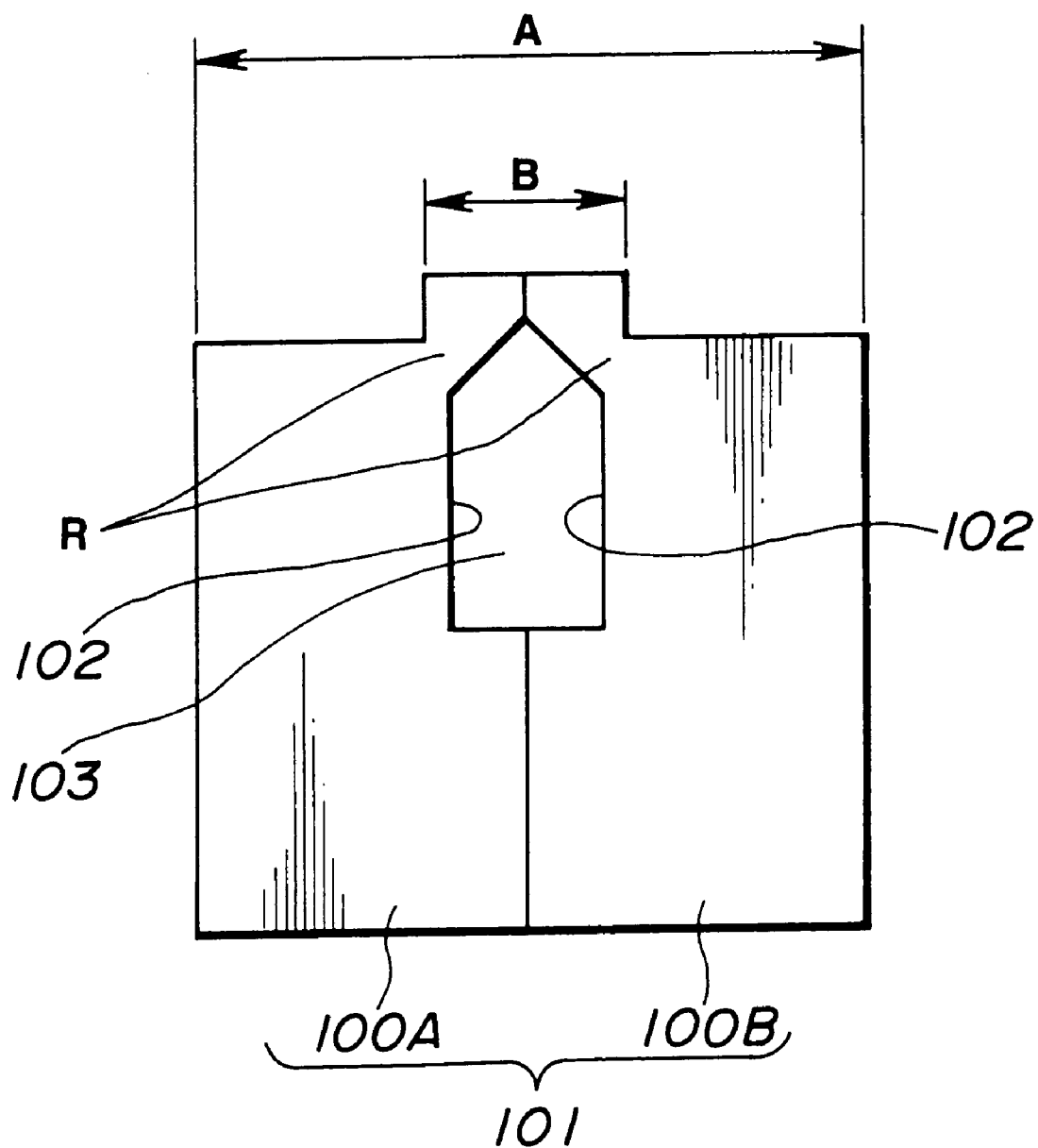
FIG. 2 is a plane view of a conventional magnetic core.
Figure 3:
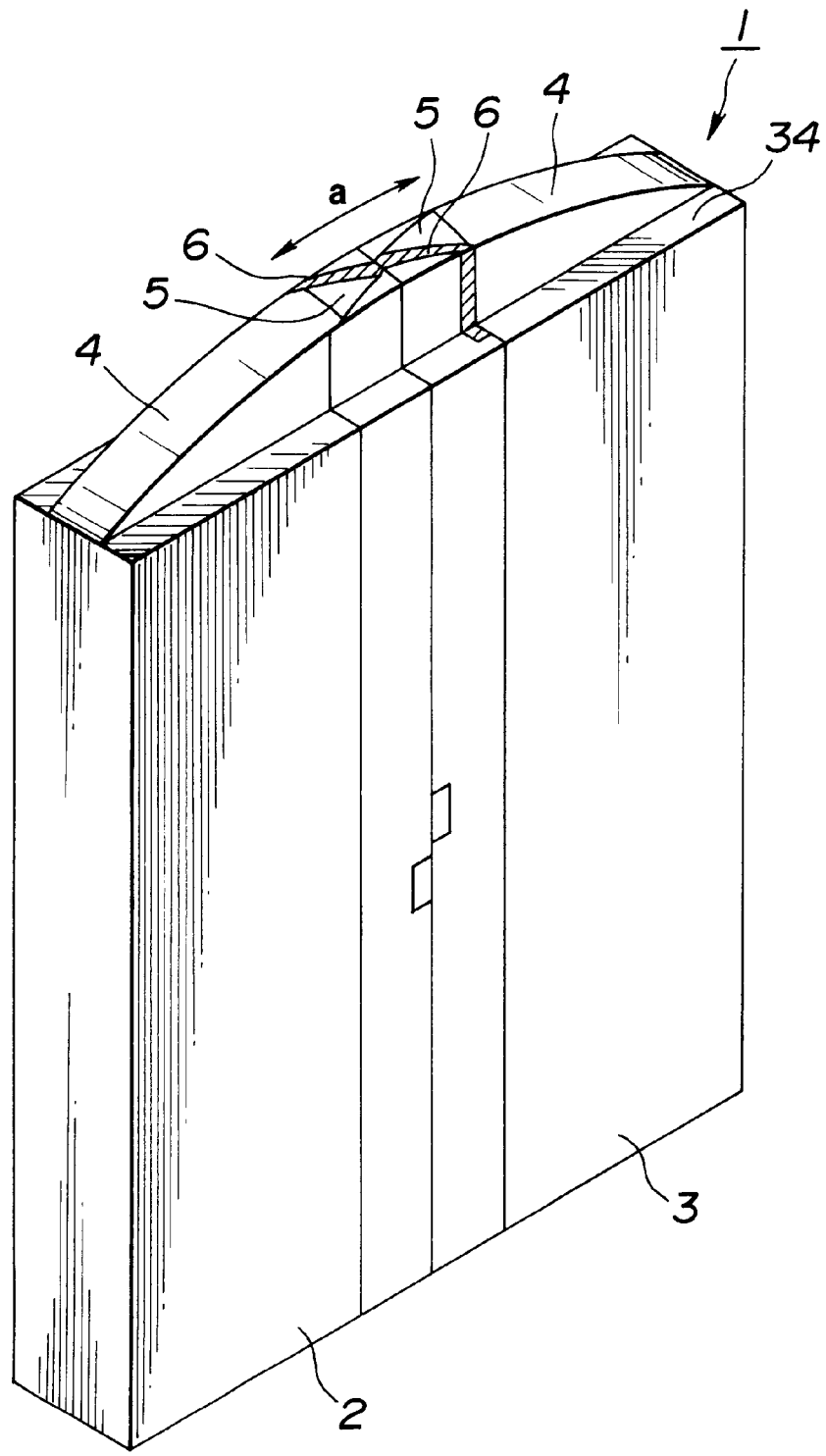
FIG. 3 is a slant view of a magnetic head according to the present invention.
Figure 4:
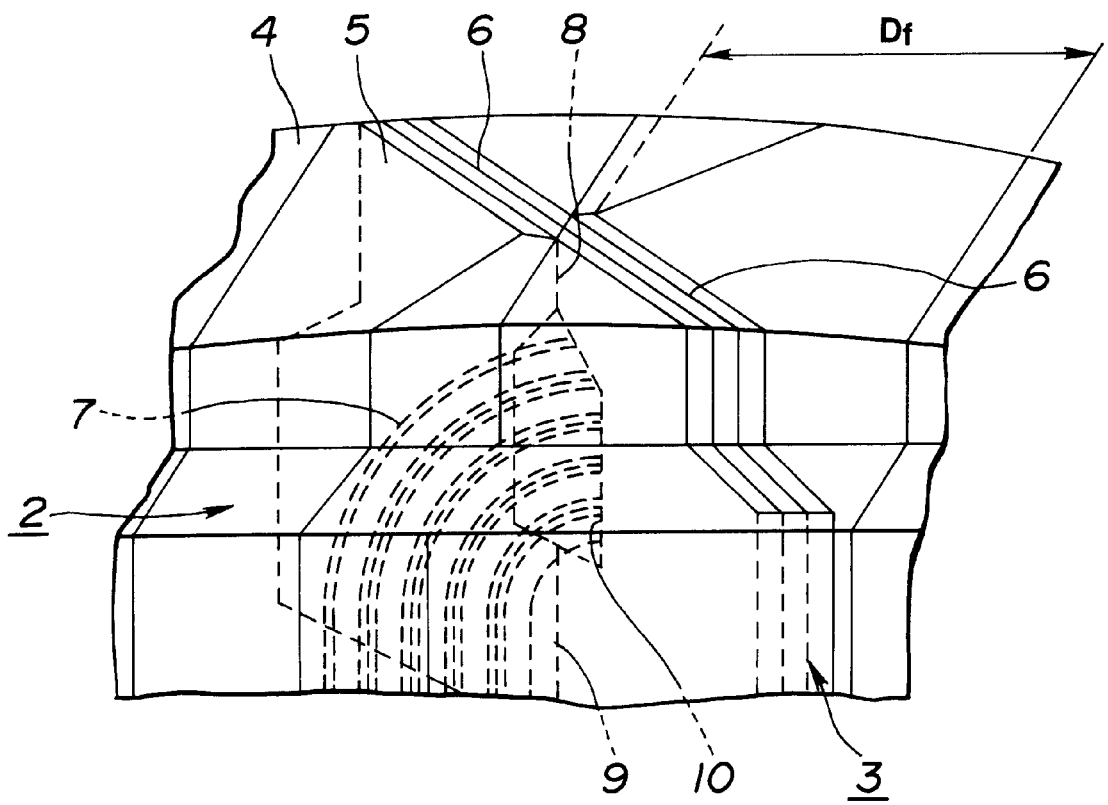
FIG. 4 is a slant view of a main part of a magnetic head according to the present invention.

The magnetic head 1 according to the present invention, as shown in FIG. 3 and 4, is formed by joining a pair of magnetic head half members 2 and 3 through a gap matter (not shown) consisting of a nonmagnetic substance. The magnetic head 1 reproduces a signal magnetic field recorded into a magnetic recording medium or records the signal magnetic field into the magnetic recording medium by sliding the magnetic recording medium in the direction as shown by an arrow a with the magnetic head half members 2 and 3 joined. A pair of magnetic head half members 2 and 3 includes nonmagnetic substrates 4, assistant cores 5 formed on the nonmagnetic substrates 4 and magnetic metal films 6 formed on the assistant cores 5 respectively. Further, a coil 7 for exciting or detecting inductive electromotive voltage is formed on at least one of a pair of magnetic head half members 2 and 3.

In the magnetic head 1, the magnetic metal films 6 form the magnetic core with a pair of magnetic head half members 2 and 3 joined through the gap matter. The magnetic metal films 6 are slantly formed at the fixed angle on the assistant cores 5. Therefore, when a pair of magnetic head half members 2 and 3 is joined through the gap matter, the magnetic core is slantly disposed to the direction of sliding the magnetic recording medium.

In the magnetic head half members 2 and 3, the nonmagnetic substrates 4 include, for example, nonmagnetic materials of MnO-NiO series, however, not limited by them, may include calcium titanate, barium titanate, zirconium oxide (zirconia), alumina, alumina titan carbide, $SiO_2$, Zn ferrite, crystal glass, hard glass and so on. Further, the assistant cores 5 include magnetic materials, for example, Mn-Zn ferrite and so on. Furthermore, the magnetic metal films 6 include magnetic metal materials, for example, Fe-Al-Si alloy (Sendust) and so on, however, not limited by them, may include crystalloid alloy such as Fe-Al alloy, Fe-Si-Co alloy, Fe-Ga-Si alloy, Fe-Ga-Si-Ru alloy, Fe-Al-Ge alloy, Fe-Ga-Ge alloy, Fe-Si-Ge alloy, Fe-Co-Si-Al alloy, Fe-Ni alloy. Or the magnetic metal films 6 may include alloy including more than one element of Fe, Co and Ni and more than one element of P, C, B and Si, metal-metalloid series amorphous alloy, the main components of which are the elements, such as the alloy including Al, Ge, Be, Sn, In, Mo, W, Ti, Mn, Cr, Zr, Hf, Nb and so on, or noncrystalloid alloy such as metal-metalloid series amorphous alloy the main components of which are transition metal such as Co, Hf and Zr and rare earth elements.

In the magnetic head half members 2 and 3, a pair of magnetic metal films 6 including the magnetic metal films forms the magnetic core by joining the magnetic head half members 2 and 3. The magnetic metal films 6, the width of the end opposite to the magnetic recording medium is small, have no concave part for forming a coil (not shown) for forming a coil 7. In the magnetic metal films 6, a front gap 8 is on the side of the surface opposite to the magnetic recording medium and the end opposite to the front gap 8 is a back gap 9. When the magnetic core is formed by joining the magnetic metal films 6 formed as above mentioned, the magnetic core is almost convex on the whole and has an opening part 10 by the concave part for forming the coil almost at the center. The magnetic gap is formed between the front gap 8 and the back gap 9 by joining a pair of magnetic metal films 6 through the gap matter.

The magnetic head 1 has the assistant cores 5 which are joined with the magnetic core in a body. The assistant cores 5 include the magnetic substance, are formed on one side of the magnetic metal films 6 and are magnetically connected with the magnetic metal films 6. That is to say; the assistant cores 5 are disposed between the nonmagnetic substrates 4 and the magnetic metal films 6 and form a magnetic path with the magnetic metal films 6. Here, it is preferred that boundary between the assistant core 5 and the nonmagnetic substrate 4 as shown by Df in FIG. 4 is a starting point and the maximum length of the assistant cores 5 is more than 15 micrometers and less than 450 micrometers.

The coil 7 is spirally formed as the back cap 9 is the center by conductive metal by using the method for forming a thin film such as the electrolytic plating method.

In the magnetic head 1 relating to the present embodiment formed as above mentioned, the magnetic core including the a pair of magnetic metal films 6 forms the main magnetic path when recording a signal to the magnetic recording medium or reproducing the signal magnetic field, the magnetic core consisting of a pair of magnetic metal films 6 forms the main magnetic path. Further, in the magnetic metal films 6, the assistant cores 5 assist the magnetic path at the part the cross section of which is small. Thus, in the magnetic head 1, the assistant cores 5 assist the magnetic path at the part where magnetic resistance of the magnetic metal films 6 becomes large.

Therefore, in the magnetic head 1, the magnetic resistance at each part forming the magnetic path is not sharply changed. The electromagnetic conversion characteristic of the magnetic head 1 becomes better when the magnetic resistance at the magnetic path is ideally distributed.

Figure 5:
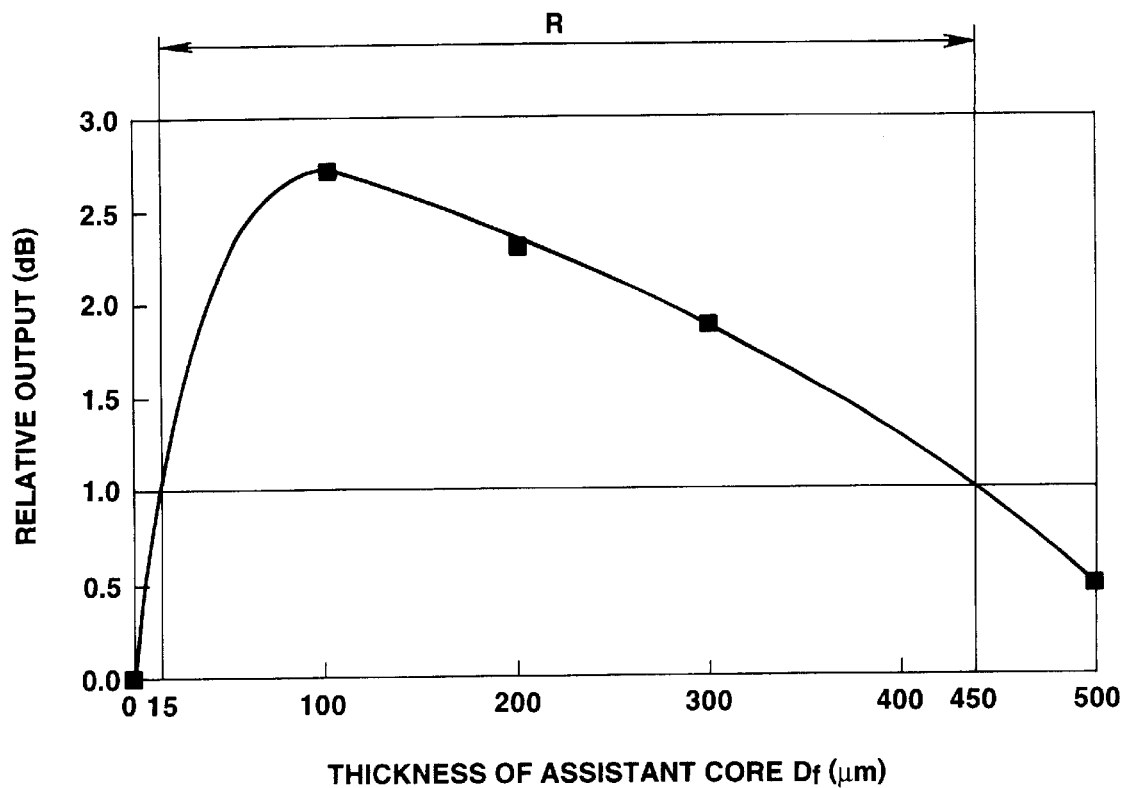
FIG. 5 is a characteristic view showing relation between thickness of an assistant core and relative output of a magnetic head.

Here, relation between length of the assistant cores 5 and output of the magnetic head 1 is shown in FIG. 5. In FIG. 5, the axis of abscissas shows Df of the length of the assistant cores 5 and the axis of ordinates shows relative output as the reference when Df of the length of the assistant cores 5 is 0 micrometers, that is to say, there is no assistant core 5. Then, the relation was calculated by linear analysis by the three dimensional finite element method. As the calculation condition in the three dimensional finite element method, the number of elements is about 7000, relative permeability of the magnetic metal film is about 1000 and the relative permeability of the assistant core 5 is about 500.

As clear from FIG. 5, when the range shown by R in FIG. 5, that is to say, the maximum of the length of the assistant core 5 is more than 15 micrometers and less than 450 micrometers, the relative output is improved by more than 1 dB comparing to the case that there is no assistant core 5. Because the assistant cores 5 relieve sharply increasing of the magnetic resistance at the part where the cross sections of the magnetic metal films 6 decrease, and the magnetic resistance of the magnetic core is ideally distributed. Therefore, in the magnetic head 1, the electromagnetic conversion characteristic is improved.

On one hand, in the magnetic head 1, it is more preferable that thickness of the assistant cores 5 is larger than contact width of a tape. As the contact width of the tape is about 80 micrometers in case of the magnetic head 1 according to the present embodiment, it is preferred that the thickness of the assistant cores 5 is from about 80 to about 300 micrometers.

In the magnetic head 1, the contact condition with the magnetic recording medium is improved by making the thickness of the assistant cores 5 larger than the contact width of the tape. At the same time, in the magnetic head 1, there is a boundary between the assistant core 5 and the nonmagnetic substrate 4 on the outside of the area contacted with the magnetic recording medium. Therefore, in the magnetic head 1, the electromagnetic conversion characteristic is not degraded by so-called canter effect generated at the boundary between the assistant core 5 and the nonmagnetic substrate 4.

In the magnetic head 1 according to the present invention formed as above mentioned, plural magnetic head half members 2 and 3 are formed on the same substrate. The magnetic head 1 is formed by pasting a pair of the substrates and separating into individual magnetic head 1.

Figure 6:
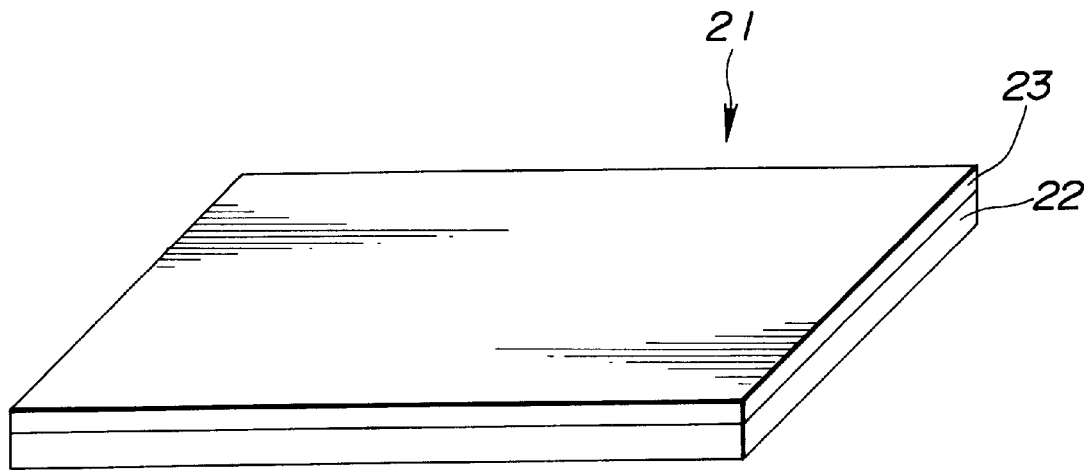
FIG. 6 is a slant view showing a manufacturing process in manufacturing a magnetic head according to the present invention.

First, in order to manufacture the magnetic head 1, as shown in FIG. 6, an almost flat substrate 21 is prepared. The substrate 21 is, for example, is about 2 mm thick and is about 30 mm long and wide respectively. The substrate 21 is formed as a magnetic layer 23 is formed on a nonmagnetic layer 22. Here, the magnetic layer 23 is a layer that is the assistant core 5 in the magnetic head 1, and it is preferred that thickness, as above mentioned, is formed larger than 15 micrometers and less than 450 micrometers.

Figure 7:
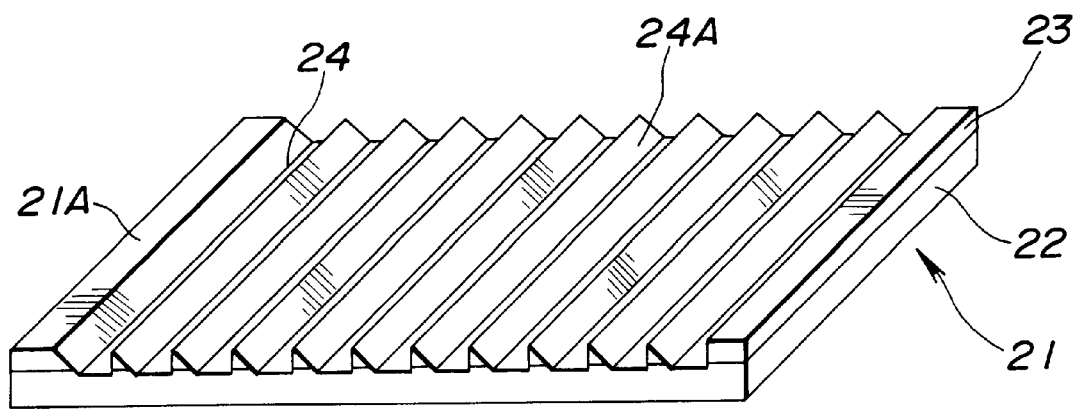
FIG. 7 is a slant view showing a manufacturing process in manufacturing a magnetic head according to the present invention.

Next, as shown in FIG. 7, a first groove processing is executed to a side surface 21A on which the magnetic layer 23 of the substrate 21 is formed. In the first groove processing, plural grooves 24 for forming the magnetic core are formed in parallel at angle of, for example, about 45 degrees to the one side surface 21A. Plural inclined surfaces 24A are formed by the grooves 24 for forming the magnetic core formed by the first groove processing.

Figure 8:
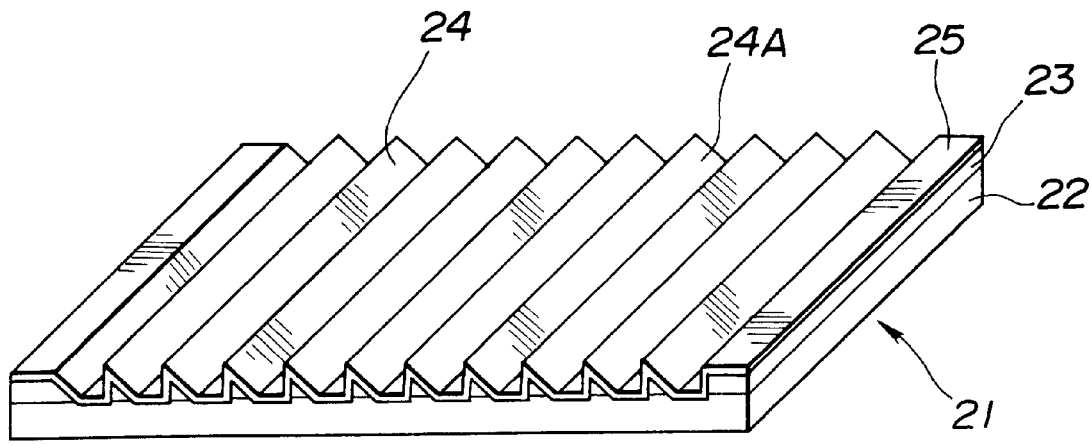
FIG. 8 is a slant view showing a manufacturing process in manufacturing a magnetic head according to the present invention.

Next, as shown in FIG. 8, a magnetic metal film 25 including the materials is formed on the inclined surface 24A. In this process for forming the film, a magnetic metal film 25 is formed to the inclined surface 24A so that thickness of the film is uniform. This process for forming the film is executed by the PVD method, the CVD method and so on, for example, the magnetron spattering method and so on.

Further, the magnetic metal film 25 is not limited to that formed by a single layer and may be formed by plural layers that the magnetic metal layers are laminated through the nonmagnetic layers. The magnetic metal film 25, in case of being formed by plural layers, may be formed as, for example, almina of 0. 25 micrometers is laminated on Fe-Al-Si alloy (Sendust) of 5 micrometers alternately, having three Fe-Al-Si alloy layers.

Figure 9:
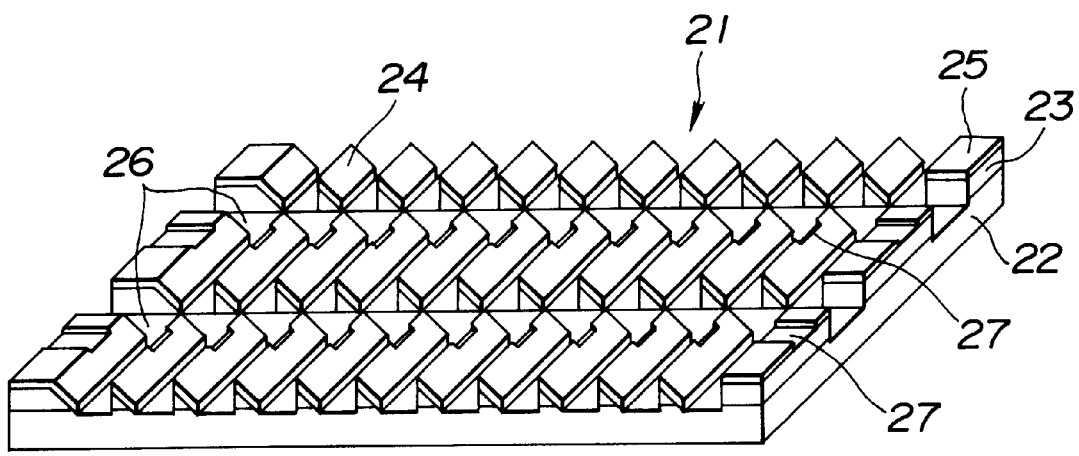
FIG. 9 is a slant view showing a manufacturing process in manufacturing a magnetic head according to the present invention.

Next, as shown in FIG. 9, a second groove processing is executed almost orthogonally to the grooves 24 for forming the magnetic core to the surface on which the magnetic metal film 25 is formed. In the second groove processing, separating grooves 26 formed for separating into the magnetic cores having the desired size and coil grooves 27 for forming concave parts for forming a coil on each magnetic core separated by the separating grooves 26 are formed.

Here, the separating grooves 26 are the grooves for forming each magnetic core by horizontally and magnetically separating the magnetic core on the substrate 21 and for forming a closed path to each magnetic core. Though two separating grooves 26 are formed in FIG. 9, separating grooves 26 should be provided by the number of formed rows of the magnetic head half members 2 and 3. Further, as the separating grooves 26 magnetically separate each magnetic core horizontally disposed side by side, the magnetic layer 23 that is the magnetic metal film 25 and the assistant core 5 should be formed to have depth enough to be completely cut.

One hand, as the coil grooves 27 form the magnetic core having the front gap 8 and the back gap 9 and the concave part for forming the coil, they should be formed having depth enough not to cut the magnetic metal film 25. Form of coil grooves 27 is decided corresponding to length of the front gap 8 and the back gap 9. Here, the coil grooves 27 is about 140 micrometers wide. That is to say, it is formed that the front gap 8 is about 300 micrometers long and the back cap 9 is about 85 micrometers long. Still, though the coil grooves 27 may is deep not to cut the magnetic metal film 25, if too deep, the magnetic path will be too long to fall efficiency of propagating magnetic flux. Further, though depth of the coil grooves 27 depend on thickness of the coil 7 formed in a process below mentioned, here it is, for example, about 2 micrometers. Further, though form of the coil grooves 27 is not limited, here, for example, the side surface on the side of the front gap 8 is an inclined surface 27A at angle of about 45 degrees. Therefore, by forming the magnetic metal film 6 to concentrate the magnetic flux on the side of the front gap 8, sensitivity is improved.

Figure 10:
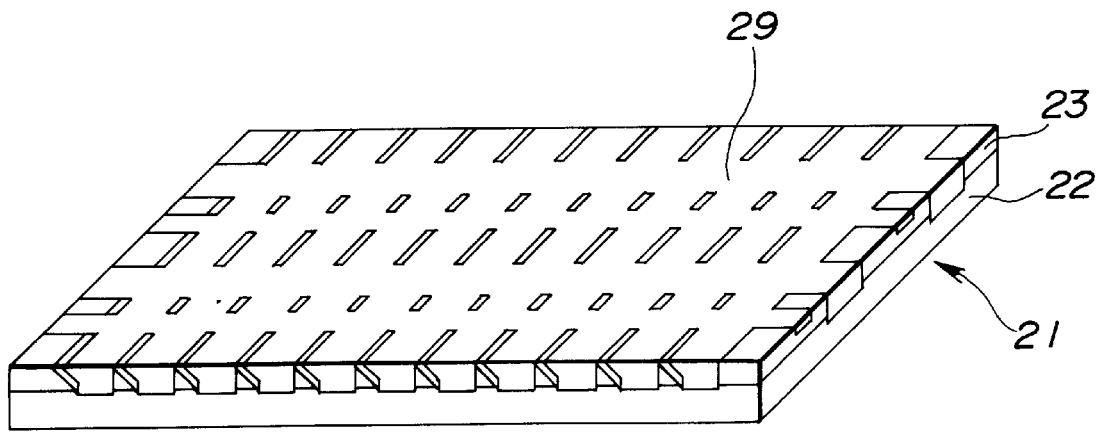
FIG. 10 is a slant view showing a manufacturing process in manufacturing a magnetic head according to the present invention.

Next, as shown in FIG. 10, melted low melting point glass 29 is filled on a main surface of the substrate 21 on which the grooves 24 for forming the magnetic core, the separating grooves 26 and the coil grooves 27 are formed as above mentioned. Then processing for making a main surface filled with the low melting point glass 29 flat is executed.

Figure 11:
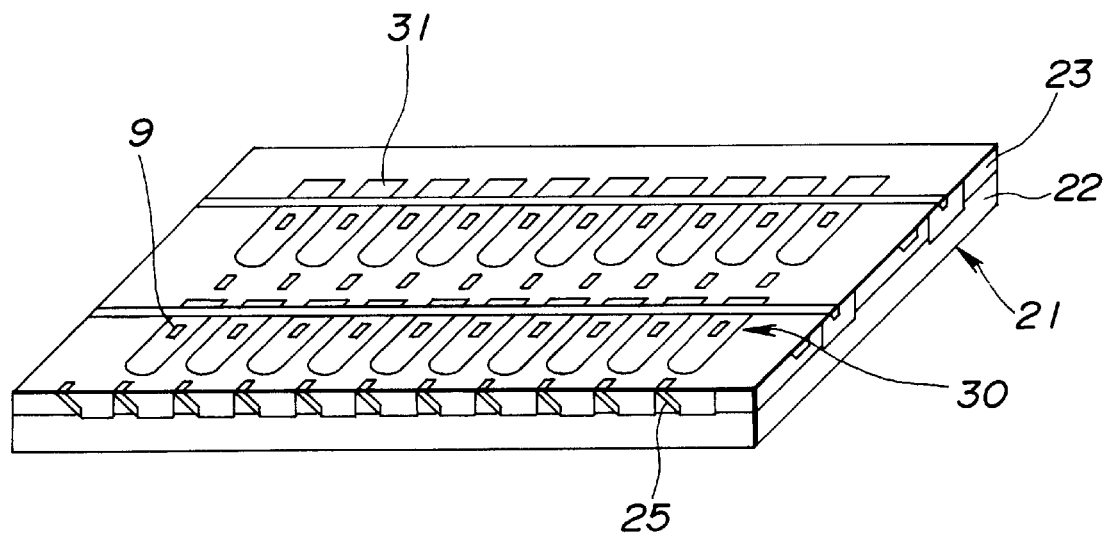
FIG. 11 is a slant view showing a manufacturing process in manufacturing a magnetic head according to the present invention.

Next, as shown in FIG. 11, a coil 7 (not shown in FIG. 11) that a back gap 9 is the center is formed. In order to form the coil 7, first, a concave part 30 for forming a coil which is, for example, about 5 micrometers deep to the low melting point glass 29 which has been processed to make the surface flat by using the method of etching and so on.

Photoresist which is patterned corresponding to desired form of coil is formed in a concave part 30 for forming the coil. Then, the coil 7 is formed by the electrolytic plating method that conductive materials such as Cu are used and so on, and the desired coil 7 is formed by removing resist. Still, the method for forming the coil 7 is not limited to the method and the spattering method, the deposition method and so on may be used.

Next, protecting layers 31 are formed for protecting the coil 7 from the open air. The protecting layers 31 are formed for burying coil forming concave parts 30 formed for forming the coil 7. Then, the processing for making flat is executed to the surface on which the protecting layers 31 are formed. Thus, the back gap 8 and coil connecting terminals 7A are formed to be exposed to the outside.

Figure 12:
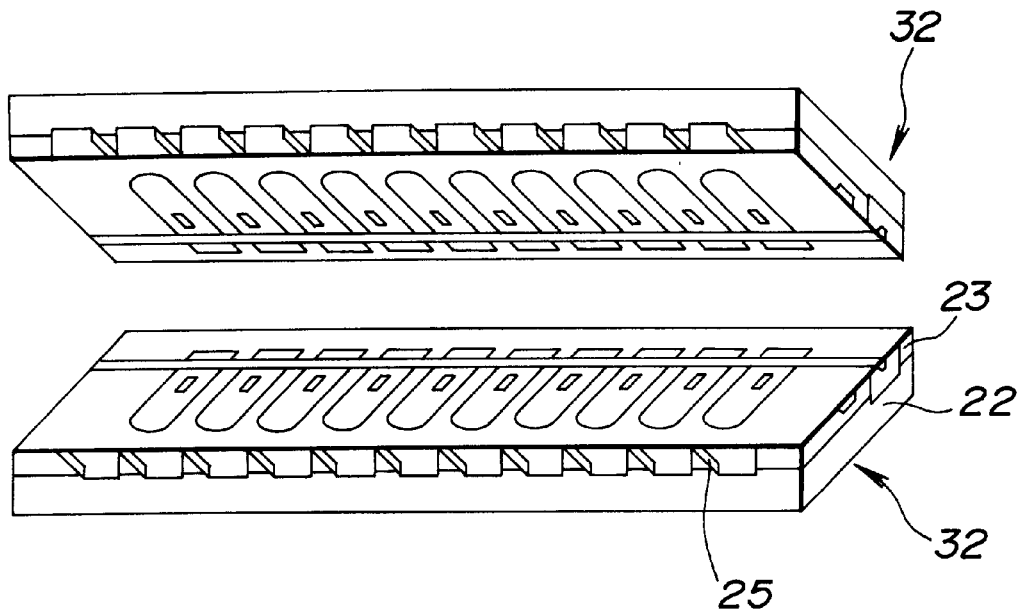
FIG. 12 is a slant view showing a manufacturing process in manufacturing a magnetic head according to the present invention.
Figure 13:
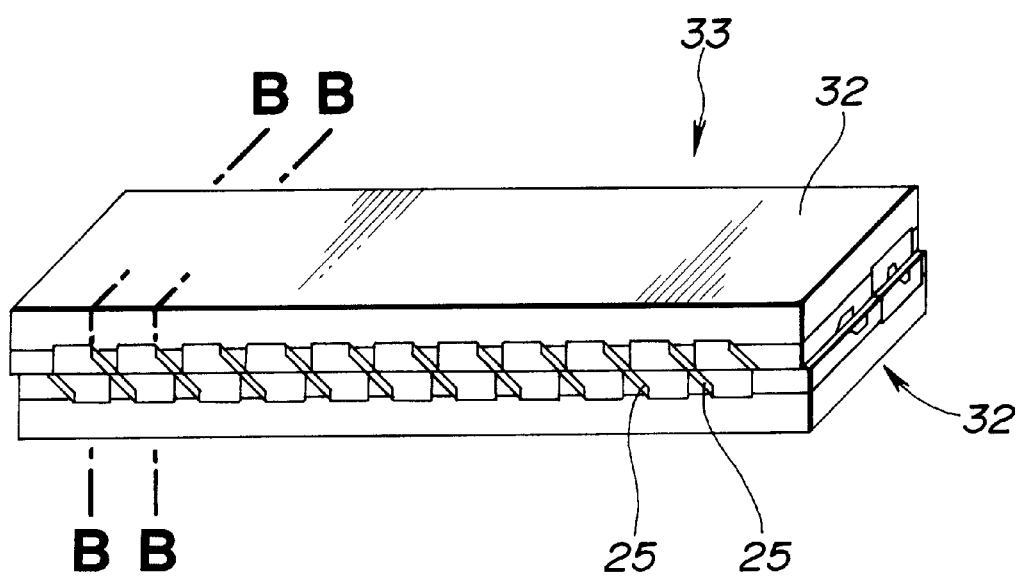
FIG. 13 is a slant view showing a manufacturing process in manufacturing a magnetic head according to the present invention.

Next, as shown in FIG. 12, magnetic head halfmember blocks 32 are formed by cutting plural magnetic head half members 6 formed at the same time as above mentioned to form horizontally a line. After that, as shown in FIG. 13, a pair of magnetic head halfmember blocks 32 are pasted. Then, a pair of magnetic head halfmember blocks 32 is positioned as the surfaces on which the protecting layers 31 are formed are opposite and the back gaps 9 and the coil connecting terminals 7A are precisely opposite. When a pair of magnetic head halfmember blocks 32 is pasted, so-called the metal diffusion joint method is used. According to the metal diffusion joint method, it is possible to join surely parts which should be electrically connected between a pair of magnetic head halfmember blocks 32.

Next, a magnetic head block 33 obtained by joining a pair of magnetic head halfmember blocks 32 as above mentioned is separated into individual magnetic head 1. Then, the magnetic head block 33 is cut by a part shown by a line B—B in FIG. 13. Therefore, the magnetic head 1 having the magnetic gap between the front gaps. Though not shown, polishing processing is executed so that the surface is cylindrical to the medium sliding surface of the magnetic head 1. Further, as the contact characteristic with the magnetic recording medium is good, a contact control groove 34 is formed to the medium sliding surface. The contact control groove 34 is formed to be almost in parallel in the sliding direction of the magnetic recording medium, controlling friction between the magnetic recording medium and the controlling groove 34.

As above described in detail, in the magnetic head relating to the present invention, the assistant cores are formed to join magnetically to the magnetic core which is the magnetic path, therefore, the magnetic core and the assistant cores function as the magnetic path. Therefore, in the magnetic head, magnetic resistance at each part of the magnetic path is not sharply changed, and ideal distribution of the magnetic resistance is shown. Therefore, in the magnetic head relating to the present invention, efficiency of electromagnetic conversion is improved when the signal magnetic field from the magnetic recording medium is reproduced or the signal magnetic field is recorded into the magnetic recording medium.

What is claimed is:

1. A magnetic head, comprising:

a pair of core half members joined together with a magnetic gap formed therebetween, each core half member comprising a nonmagnetic substrate and a magnetic assistant core joined together such that the assistant cores confront each other at said magnetic gap and said substrates are positioned with said assistant cores therebetween, each assistant core being provided with an inclined surface in the area of confrontation;

a magnetic metal film formed on the inclined surface of each assistant core such that the films extend in a direction lying diagonally across the magnetic head; and a thin film coil provided within a gap formed in said magnetic metal films.

2. The magnetic head of claim 1, wherein said magnetic metal films comprise multiple layers of magnetic metal films.

3. The magnetic head of claim 1, wherein a maximum overall length of each said assistant core as measured in a sliding direction of said head is between and including 15 micrometers and 450 micrometers.

4. The magnetic head of claim 1, wherein said inclined surfaces are inclined at an angle of 45 degrees with respect to a sliding direction of said magnetic head.

5. The magnetic head of claim 1, wherein a width of each of the assistant cores tapers along a sliding direction of said such that the width decreases from where the assistant core is secured to its respective substrate to the area of confrontation between the core half members, thereby providing a path of decreasing resistance as view from the substrate toward said area of confrontation.

6. The magnetic head of claim 5, wherein an assistant core is triangular in cross-section.

7. A magnetic head, comprising:

a pair of core half members joined together with a magnetic gap formed therebetween, each core half member comprising a nonmagnetic substrate and a magnetic assistant core joined together such that the assistant cores confront each other at said magnetic gap and said substrates are positioned with said assistant cores therebetween, each assistant core being provided with an inclined surface in the area of confrontation;

a magnetic metal film formed on the inclined surface of each assistant core such that the films extend in a direction lying diagonally across the magnetic head;

a thin film coil provided within a gap formed in said magnetic metal films;

a maximum overall length of each said assistant core as measured in a sliding direction of said head is between and including 15 micrometers and 450 micrometers; and an assistant core is triangular in cross-section.

8. The magnetic head of claim 7, wherein said inclined surfaces are inclined at an angle of 45 degrees with respect to a sliding direction of said magnetic head.

9. The magnetic head of claim 7, wherein said magnetic metal films comprise multiple layers of magnetic metal films.

* * * * *